United States Patent
Sai et al.

(10) Patent No.: US 12,202,991 B2
(45) Date of Patent: Jan. 21, 2025

(54) INK AND INK-JET RECORDING METHOD

(71) Applicant: Nippon Kayaku Kabushiki Kaisha, Tokyo (JP)

(72) Inventors: Ha Sai, Tokyo (JP); Shogo Toda, Tokyo (JP); Michiaki Takeda, Tokyo (JP); Hirotoshi Takahashi, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 241 days.

(21) Appl. No.: 17/596,715

(22) PCT Filed: Jul. 3, 2020

(86) PCT No.: PCT/JP2020/026217
§ 371 (c)(1),
(2) Date: Dec. 16, 2021

(87) PCT Pub. No.: WO2021/006211
PCT Pub. Date: Jan. 14, 2021

(65) Prior Publication Data
US 2022/0315783 A1 Oct. 6, 2022

(30) Foreign Application Priority Data

Jul. 8, 2019 (JP) .................................. 2019-126609
Jun. 12, 2020 (JP) .................................. 2020-101970

(51) Int. Cl.
| | | |
|---|---|---|
| C09D 11/30 | (2014.01) | |
| B41J 2/21 | (2006.01) | |
| B41M 5/00 | (2006.01) | |
| B41M 5/50 | (2006.01) | |
| C09D 11/107 | (2014.01) | |
| C09D 11/322 | (2014.01) | |

(52) U.S. Cl.
CPC ............ *C09D 11/30* (2013.01); *B41J 2/2107* (2013.01); *B41M 5/0023* (2013.01); *B41M 5/502* (2013.01); *C09D 11/107* (2013.01); *C09D 11/322* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 5,750,592 A | * | 5/1998 | Shinozuka | C09D 11/322 |
| | | | | 524/832 |
| 2004/0189764 A1 | * | 9/2004 | Aono | C09D 11/101 |
| | | | | 347/100 |
| 2005/0250876 A1 | * | 11/2005 | Kawaguchi | D06P 5/2077 |
| | | | | 523/160 |
| 2009/0203833 A1 | | 8/2009 | Sasada et al. | |
| 2011/0275754 A1 | * | 11/2011 | Oshima | C09D 11/322 |
| | | | | 524/547 |
| 2012/0232203 A1 | | 9/2012 | Tomura et al. | |
| 2013/0079447 A1 | | 3/2013 | Koike et al. | |
| 2013/0187998 A1 | * | 7/2013 | Ohmoto | C09D 11/322 |
| | | | | 428/206 |
| 2014/0055520 A1 | * | 2/2014 | Inumaru | C09D 11/322 |
| | | | | 347/21 |
| 2015/0197648 A1 | * | 7/2015 | Watanabe | C09D 11/36 |
| | | | | 524/505 |

(Continued)

FOREIGN PATENT DOCUMENTS

| | | |
|---|---|---|
| CN | 102918123 A | 2/2013 |
| EP | 3 075 796 A1 | 10/2016 |

(Continued)

*Primary Examiner* — Manish S Shah
(74) *Attorney, Agent, or Firm* — Knobbe, Martens, Olson & Bear, LLP

(57) ABSTRACT

An ink which comprises a water-insoluble colorant, a dispersant, a polymer resin, and water. The polymer resin is one of four monomers which are methacrylic acid and three monomers selected respectively from among C1- to C4-alkyl methacrylates, C6- to C10-alkyl acrylates, and unsaturated C2- to C4-alkyl methacrylates; and a reactive emulsifier having a radical-polymerizable double bond in the molecule. An ink-jet recording method in which the ink is used; a recording medium to which the ink has been adhered; and an ink-jet printer including a vessel filled with the ink.

12 Claims, No Drawings

(56) References Cited

U.S. PATENT DOCUMENTS

| | | | |
|---|---|---|---|
| 2016/0376452 A1* | 12/2016 | Sugita | C09D 11/36 |
| | | | 347/100 |
| 2017/0137647 A1 | 5/2017 | Kawaguchi et al. | |
| 2018/0030298 A1 | 2/2018 | Yamazaki et al. | |
| 2020/0040207 A1 | 2/2020 | Otomo et al. | |

FOREIGN PATENT DOCUMENTS

| | | |
|---|---|---|
| EP | 3 272 818 A1 | 1/2018 |
| EP | 3 584 085 A1 | 12/2019 |
| JP | 2000-034432 A | 2/2000 |
| JP | 2000-336292 A | 12/2000 |
| JP | 2009-191133 A | 8/2009 |
| JP | 2010-280830 A | 12/2010 |
| JP | 2012-184365 A | 9/2012 |
| JP | 2012-201691 A | 10/2012 |
| JP | 2012-201692 A | 10/2012 |
| JP | 2013-213210 A | 10/2013 |
| JP | 2015-081322 A | 4/2015 |
| JP | 2017-141388 A | 8/2017 |
| JP | 2017-186505 A | 10/2017 |
| JP | 2019-077848 A | 5/2019 |
| JP | 2019-104136 A | 6/2019 |
| JP | 2019-108559 A | 7/2019 |
| WO | WO 2014/156460 A1 | 10/2014 |
| WO | WO 2015/079761 A1 | 6/2015 |
| WO | WO 2015/147192 A1 | 10/2015 |
| WO | WO 2016/152580 A1 | 9/2016 |
| WO | WO 2018/181528 A1 | 10/2018 |

\* cited by examiner

INK AND INK-JET RECORDING METHOD

This application is the U.S. National Phase under 35 U.S.C. § 371 of International Application PCT/JP2020/026217, filed Jul. 3, 2020, designating the U.S., and published in Japanese as WO 2021/006211 on Jan. 14, 2021, which claims priority to Japanese Patent Application No. 2019-1266609, filed Jul. 8, 2019, and Japanese Patent Application No. 2020-101970, filed Jun. 12, 2020, the entire contents of which are incorporated herein by reference.

TECHNICAL FIELD

The present invention relates to an ink, an ink-jet recording method using the ink, a recording medium to which the ink is adhered, and an ink-jet printer including a vessel filled with the ink.

BACKGROUND ART

An ink-jet printing method using an ink-jet printer is known as one of representative color printing methods. Such an ink-jet method involves performing printing by generating a small droplet of ink and allowing the droplet to adhere to a recording medium such as paper.

Such an ink-jet printing method has been recently advanced in application for industrial use. A colorant contained in an ink-jet ink is roughly classified to a water-soluble colorant and a water-insoluble colorant. A water-insoluble colorant, a typical example thereof being a pigment, has generally excellent robustness in various kinds as compared with a water-soluble colorant. Thus, an industrial ink-jet ink often contains a water-insoluble colorant. On the contrary, a water-insoluble colorant generally has inferior chromogenic properties as compared with a water-soluble colorant. Against such a background, there is a strong need for an industrial ink containing a water-insoluble colorant and having excellent chromogenic properties.

A recording medium for industrial use is diversified to various kinds of paper, fibers, films, and the like, and an ink-non-absorbable or ink-poorly-absorbable recording medium is also frequently adopted. In the case of printing on such an ink-non-absorbable or ink-poorly-absorbable recording medium, a known ink for use in such printing is, for example, a non-aqueous solvent ink or a curable ink. However, there is a strong need for an aqueous ink which replaces such an ink, from the viewpoint of safety to a nature environment, a living body, and the like. Such an aqueous ink contains a water-insoluble colorant and a dispersant, and generally further contains also a polymer, wax, and the like for the purposes of enhancements in scratch resistance, solvent resistance, and the like. Such an aqueous ink has a high solid content, and thus is extremely easily dried and easily generates a solid material due to such drying. In the case of printing on an ink-non-absorbable or ink-poorly-absorbable recording medium, a coating film is formed by such a solid material, which results in enhancements in fixability and scratch resistance to the recording medium. Thus, tougher coating film formed by the solid material is desirable.

On the contrary, drying of an ink is caused also by long-term storage, storage in a high-temperature or low-humidity environment, or the like. If an ink with which an ink-jet printer is filled is dried, a solid material is generated in a nozzle of an ink-jet head, or in an ink passage, and causes clogging. Such clogging caused in an ink-jet head cannot allow stable ink ejection to be performed and causes the problem of deterioration in quality of a recorded image. Furthermore, a large problem is that an ink-jet head by itself may also be sometimes made unusable. Thus, there is also a strong need for performance which can allow for easy washing off of a solid material, even if the solid material is generated in an ink-jet head or the like. However, enhancements in fixability and scratch resistance due to formation of the coating film, and performance which can allow for easy washing off are incompatible with each other, and thus there has not been yet proposed any ink which satisfies both such effects. For the reasons, there has been proposed, for example, a method for preventing drying of an ink by equipping a nozzle portion of an industrial ink-jet head with a cap member. However, it is still extremely difficult to completely prevent drying of an ink.

Patent Documents 1 to 6 each describe a resin emulsion or a resin particle dispersion, and an ink composition containing the same.

Patent Document 1: PCT International Publication No. WO2015/147192

Patent Document 2: Japanese Unexamined Patent Application, Publication No. 2000-34432

Patent Document 3: Japanese Unexamined Patent Application, Publication No. 2000-336292

Patent Document 4: Japanese Unexamined Patent Application, Publication No. 2009-191133

Patent Document 5: Japanese Unexamined Patent Application, Publication No. 2013-213210

Patent Document 6: Japanese Unexamined Patent Application, Publication No. 2017-141388

DISCLOSURE OF THE INVENTION

Problems to be Solved by the Invention

An object of the present invention is to provide an ink having favorable chromogenic properties and also excellent scratch resistance and washability, as well as an ink-jet recording method using the ink, a recording medium to which the ink is adhered, and an ink-jet printer including a vessel filled with the ink.

Means for Solving the Problems

The following aspects are encompassed in specific means for solving the above problems.

1)

An ink containing: a water-insoluble colorant; a dispersant; a polymer resin; and water; wherein the polymer resin includes four types of monomers, one type of monomer being selected from each of methacrylic acid, C1-C4 alkyl methacrylates, C6-C10 alkyl acrylates, and unsaturated C2-C4 alkyl methacrylates, and a reactive emulsifier having a radically-polymerizable double bond in a molecule thereof.

2)

The ink according to 1), wherein the reactive emulsifier is an anion-type reactive emulsifier having an anionic group in a molecule thereof.

3)

The ink according to 2), wherein the anionic group is a salt of a sulfuric acid ester group.

4)

The ink according to any one of 1) to 3), further containing a water-soluble organic solvent.

5)

An ink-jet recording method including performing recording by ejecting a droplet of the ink according to any one of 1) to 4) from an ink-jet printer depending on a recording signal, to allow the droplet to adhere to a recording medium.

6)

The ink-jet recording method according to 5), wherein the recording medium is a recording medium having an ink-receiving layer.

7)

The ink-jet recording method according to 5), wherein the recording medium is a recording medium having no ink-receiving layer.

8)

The ink-jet recording method according to any one of 5) to 7), wherein the ink-jet printer is a line head type ink-jet printer.

9)

A recording medium having the ink according to any one of 1) to 4) adhered thereto.

10)

The recording medium according to 9), wherein the recording medium is a recording medium selected from a recording medium having an ink-receiving layer and a recording medium having no ink-receiving layer.

11)

An ink-jet printer including a vessel filled with the ink according to any one of 1) to 4).

12)

The ink-jet printer according to 11), wherein the ink-jet printer is a line head type ink-jet printer.

Effects of the Invention

According to the present invention, there can be provided an ink having favorable chromogenic properties, and also excellent scratch resistance and washability, as well as an ink-jet recording method using the ink, a recording medium to which the ink is adhered, and an ink-jet printer including a vessel filled with the ink.

PREFERRED MODE FOR CARRYING OUT THE INVENTION

<Ink>

An ink according to the present embodiment contains a water-insoluble colorant, a dispersant, a polymer resin, and water, wherein the polymer resin includes four types of monomers, one type of monomer being selected from each of methacrylic acid, C1-C4 alkyl methacrylates, C6-C10 alkyl acrylates, and unsaturated C2-C4 alkyl methacrylates, and a reactive emulsifier having a radically-polymerizable double bond in a molecule thereof. Hereinafter, each component contained in the ink according to the present embodiment is described in detail. Such each component described below may be used singly or in combinations of two or more kinds thereof.

[Water-Insoluble Colorant]

The water-insoluble colorant means a colorant usually having a solubility in water at 25° C., of 3 g/L or less, preferably 2 g/L or less, more preferably 1 g/L or less.

Examples of the water-insoluble colorant can include a pigment, a dispersive dye, and a solvent dye. Representative such colorants include respective colorants selected from C.I. Pigment, C.I. Disperse, and C.I. Solvent.

Examples of the pigment include an inorganic pigment, an organic pigment, and an extender pigment.

Examples of the inorganic pigment include carbon black, metal oxide, metal hydroxide, metal sulfide, metal ferrocyanide, and metal chloride.

Examples of the carbon black include thermal black, acetylene black, oil furnace black, gas furnace black, lamp black, gas black, and channel black. In particular, furnace black, lamp black, acetylene black, channel black, and the like are preferable. Various types of carbon black can be easily available from, for example, Columbia Carbon Co., Ltd., Cabot Corporation, Degussa AG, and Mitsubishi Chemical Corporation.

Examples of the organic pigment include a soluble azo pigment, an insoluble azo pigment, an insoluble diazo pigment, a condensed azo pigment, a phthalocyanine pigment, a quinacridone pigment, an isoindolinone pigment, a dioxazine pigment, a perylene pigment, a perinone pigment, a thioindigo pigment, an anthraquinone pigment, and a quinophthalone pigment.

Specific examples of the organic pigment include C.I. Pigment Yellow 1, 2, 3, 12, 13, 14, 16, 17, 24, 55, 73, 74, 75, 83, 93, 94, 95, 97, 98, 108, 114, 128, 129, 138, 139, 150, 151, 154, 180, 185, 193, 199, and 202; C.I. Pigment Red 5, 7, 12, 48, 48: 1, 57, 88, 112, 122, 123, 146, 149, 150, 166, 168, 177, 178, 179, 184, 185, 202, 206, 207, 254, 255, 257, 260, 264, 269, and 272; C.I. Pigment Blue 1, 2, 3, 15, 15:1, 15:2, 15:3, 15:4, 15:6, 16, 22, 25, 60, 66, and 80; C.I. Pigment Violet 19, 23, 29, 37, 38, and 50; C.I. Pigment Orange 13, 16, 68, 69, 71, and 73; C.I. Pigment Green 7, 36, and 54; and C.I. Pigment Black 1.

Examples of the extender pigment include silica, calcium carbonate, talc, clay, barium sulfate, and white carbon. Such an extender pigment is often used in combination with the inorganic pigment or the organic pigment for the purpose of an enhancement in fluidity of a powder.

The insoluble colorant here used can be a self-dispersion pigment to which self-dispersibility is imparted by a chemical treatment of the surface of a pigment particle.

Examples of the dispersive dye include C.I. Dispers Yellow 9, 23, 33, 42, 49, 54, 58, 60, 64, 66, 71, 76, 79, 83, 86, 90, 93, 99, 114, 116, 119, 122, 126, 149, 160, 163, 165, 180, 183, 186, 198, 200, 211, 224, 226, 227, 231, and 237; C.I. Dispers Red 60, 73, 88, 91, 92, 111, 127, 131, 143, 145, 146, 152, 153, 154, 167, 179, 191, 192, 206, 221, 258, and 283; C.I. Dispers Orange 9, 25, 29, 30, 31, 32, 37, 38, 42, 44, 45, 53, 54, 55, 56, 61, 71, 73, 76, 80, 96, and 97; C.I. Dispers Violet 25, 27, 28, 54, 57, 60, 73, 77, 79, and 79:1; and C.I. Dispers Blue 27, 56, 60, 79:1, 87, 143, 165, 165:1, 165:2, 181, 185, 197, 202, 225, 257, 266, 267, 281, 341, 353, 354, 358, 364, 365, and 368.

Examples of the water-insoluble colorant can also include a water-insoluble copolymer colored by a water-soluble colorant. Examples of the water-insoluble copolymer include polyester, and a dispersant and a polymer resin described below.

Examples of the water-soluble colorant include a direct dye, an acidic dye, an edible dye, a basic dye, a reactive dye, a vat dye, and a soluble vat dye. Representative such colorants include respective dyes selected from C.I. Direct, C.I. Acid, C.I. Food, C.I. Basic, C.I. Reactive, C.I. Vat, and C.I. Solubilised Vat.

The copolymer in the water-insoluble copolymer colored by the water-soluble colorant, and, for example, the copolymer for use as the dispersant may be the same copolymers or may be different copolymers. In a case where the same copolymers are used, the copolymer colored by the water-soluble colorant and the copolymer not colored by any water-soluble colorant respectively correspond to the water-insoluble colorant and the dispersant.

Such a water-insoluble colorant is preferably a pigment, more preferably a pigment selected from C.I. Pigments.

The content rate of the water-insoluble colorant in the total mass of the ink according to the present embodiment is usually 1 to 30% by mass, preferably 1 to 15% by mass, more preferably 2 to 10% by mass.

[Dispersant]

The dispersant is used for the purpose of dispersing the water-insoluble colorant in the ink. While the dispersant is not particularly limited and a known dispersant can be used, a polymer dispersant such as a resin is generally used. Examples of such a resin include polymers derived from, for example, ionic monomers such as $\alpha,\beta$-unsaturated monomers such as polyvinyl alcohol, a cellulose-based derivative, polyethylene oxide, polypropylene oxide, (meth)acrylic acid, crotonic acid, itaconic acid, itaconic acid monoester, maleic acid, maleic acid monoester, fumaric acid, fumaric acid monoester, vinyl sulfonic acid, sulfoethyl methacrylate, sulfopropyl methacrylate, and sulfonated vinylnaphthalene, and styrene, a styrene derivative, vinylnaphthalene, a vinylnaphthalene derivative, an aliphatic alcohol ester of $\alpha,\beta$-ethylenically unsaturated carboxylic acid, acrylonitrile, vinylidene chloride, vinyl acetate, vinyl chloride, (meth) acrylamide, hydroxyethyl (meth) acrylate, hydroxypropyl (meth) acrylate, glycidyl (meth)acrylate, and N-butoxymethyl (meth)acrylamide.

The term "(meth)acryl" is herein used as the meaning including both "acryl" and "methacryl". The same applies to, for example, the term "(meth)acrylate".

The dispersant can be available as a commercialized product, or can be synthesized. Specific examples of the commercialized product include Joncryl 62, 67, 68, 678, and 687 (styrene-acrylic copolymers manufactured by BASF); Mowinyl S-100A (modified vinyl acetate copolymer manufactured by Japan Coating Resin Co., Ltd.); and Jurymer AT-210 (polyacrylic acid ester copolymer manufactured by Toagosei Co., Ltd.).

Examples of the dispersant obtained by synthesis include an A-B block polymer disclosed in PCT International Publication No. WO2013/115071, and such a polymer which is preferred. The method for producing the A-B block polymer is also the same as the production method disclosed in PCT International Publication No. WO2013/115071. Examples of the A-B block polymer disclosed in PCT International Publication No. WO2013/115071 include one in which the monomer constituting the A block is at least one monomer selected from (meth)acrylic acid and a linear or branched C4 alkyl (meth)acrylate and the monomer constituting the B block is at least one monomer selected from benzyl methacrylate and benzyl acrylate. The monomer constituting the A block is preferably at least one monomer selected from methacrylic acid and n-butyl methacrylate, and such two monomers are more preferably used in combination. The monomer constituting the B block is preferably benzyl methacrylate. Specific examples thereof include block copolymers disclosed in Synthesis Examples 3 to 8 in PCT International Publication No. WO2013/115071.

The dispersant usually has a mass average molecular weight (Mw) of 10000 to 60000, preferably 10000 to 40000, more preferably 15000 to 30000, further preferably 20000 to 25000. The dispersant usually has an acid value of 90 to 200 mgKOH/g, preferably 100 to 150 mgKOH/g, more preferably 100 to 120 mgKOH/g. The dispersant has a PDI (mass average molecular weight/number average molecular weight) of about 1.29 to 1.49. The above ranges tend to allow the ink to be improved in dispersibility and storage stability.

The dispersant can be used in the state of being mixed with the water-insoluble colorant. The dispersant can also be used in the state of partially or fully covering a surface of the water-insoluble colorant. Alternatively, both such states may also be adopted in combination.

The ink according to the present embodiment is preferably prepared by preparing a dispersion liquid containing the water-insoluble colorant and the dispersant, and then mixing the dispersion liquid with other components. The method for preparing the dispersion liquid, here adopted, can be a known method.

One example of the method for preparing the dispersion liquid is a phase inversion emulsification method. In other words, the dispersant is dissolved in an organic solvent such as 2-butanone, and an aqueous solution of a neutralizing agent is added thereto, to thereby prepare an emulsified liquid. The emulsified liquid obtained is subjected to addition of the water-insoluble colorant and then a dispersing treatment. The organic solvent and some water are distilled off from the thus obtained liquid under reduced pressure, to thereby enable an objective dispersion liquid to be obtained. The dispersing treatment can be performed by using, for example, a sand mill (bead mill), a roll mill, a ball mill, a paint shaker, an ultrasonic disperser, or a microfluidizer. In one example, in a case where the sand mill is used, the dispersing treatment can be performed by using beads having a particle size of about 0.01 to 1 mm, and appropriately setting the filling rate with the beads. The dispersion liquid obtained as described above may also be subjected to an operation such as filtration and/or centrifugation. This operation enables the size of the particle included in the dispersion liquid to be uniformed. When foaming is caused in preparation of the dispersion liquid, an extremely trace amount of a defoamer such as known silicone-based acetylene glycol may be added.

Examples of any method for preparing the dispersion liquid, other than the above, include an acid precipitation method, an interfacial polymerization method, an in-situ polymerization method, an in-liquid curing coating method, a coacervation (phase separation) method, an in-liquid drying method, a melting dispersion cooling method, an air suspension coating method, and a spray drying method.

Among these preparation methods, a phase inversion emulsification method, an acid precipitation method, and an interfacial polymerization method are preferable.

The water-insoluble colorant in the dispersion liquid usually has an average particle size (D50) of 300 nm or less, preferably 30 to 280 nm, more preferably 40 to 270 nm, further preferably 50 to 250 nm. The water-insoluble colorant usually has an average particle size (D90) of 400 nm or less, preferably 350 nm or less, more preferably 300 nm or less. The lower limit is preferably 100 nm or more. The water-insoluble colorant usually has an average particle size (D10) of 10 nm or more, preferably 20 nm or more, more preferably 30 nm or more. The upper limit is preferably 100 nm or less. The particle size of the water-insoluble colorant can be measured with laser light scattering.

The content rate of the dispersant in the total mass of the ink according to the present embodiment is usually 0.5 to 6.0% by mass, preferably 0.5 to 4.0% by mass, more preferably 1.0 to 4.0% by mass.

[Polymer Resin]

The polymer resin is a copolymer formed from four types of monomers, one type of monomer being selected from each of methacrylic acid, C1-C4 alkyl methacrylates, C6-C10 alkyl acrylates, and unsaturated C2-C4 alkyl methacrylates, and a reactive emulsifier having a radically-polymerizable double bond in a molecule thereof. Such a polymer resin is used, resulting in a tendency to allow the ink to be more enhanced in storage stability and scratch resistance.

Examples of the type of the copolymer include a block copolymer, a random copolymer, and a graft copolymer, and a random copolymer is preferable. The polymer resin may be in the form of a salt. The polymer resin can be synthesized by a known method.

Examples of the C1-C4 alkyl methacrylate include those each having a linear alkyl moiety, such as methyl methacrylate, ethyl methacrylate, n-propyl methacrylate, and n-butyl methacrylate; those each having a branched alkyl moiety, such as isopropyl methacrylate, isobutyl methacrylate, and t-butyl methacrylate; and those each having a cyclic alkyl moiety, such as cyclopropyl methacrylate and cyclobutyl methacrylate. In particular, one having a linear alkyl moiety is preferable, C1-C3 alkyl methacrylate having a linear alkyl moiety is more preferable, and methyl methacrylate is further preferable.

Examples of the C6-C10 alkyl acrylate include those each having a linear alkyl moiety, such as hexyl acrylate, heptyl acrylate, octyl acrylate, nonyl acrylate, and decyl acrylate; those each having a branched alkyl moiety, such as isohexyl acrylate, isoheptyl acrylate, isooctyl acrylate, 2-ethylhexyl acrylate, isononyl acrylate, and isodecyl acrylate; and those each having a cyclic alkyl moiety, such as cyclohexyl acrylate, 4-t-butylcyclohexyl acrylate, cycloheptyl acrylate, cyclooctyl acrylate, cyclononyl acrylate, and cyclodecyl acrylate. In particular, one having a branched alkyl moiety is preferable, C8 alkyl acrylate having a branched alkyl moiety is more preferable, and 2-ethylhexyl acrylate is further preferable.

Examples of the unsaturated C2-C4 alkyl methacrylate include C2-C4 alkenyl methacrylates such as vinyl methacrylate, allyl methacrylate, 2-butenyl methacrylate, 3-methyl-2-butenyl methacrylate, and 3-butenyl methacrylate. In particular, C2-C4 alkenyl methacrylate is preferable, C3 alkenyl methacrylate is more preferable, and allyl methacrylate is further preferable.

The target of the range of the content with respect to each of the four types of monomers is shown in Table 1 below. The range is preferably adjusted within the range in Table 1 so that the total content of the monomers is 100 parts by mass. In Table 1, numerical values are each represented by "part(s) by mass", and abbreviations each mean the following.

MAA: methacrylic acid
MC1-4: C1-C4 alkyl methacrylate
AC6-10: C6-C10 alkyl acrylate
MKC2-4: unsaturated C2-C4 alkyl methacrylate

TABLE 1

| Content range | Usual | Preferable | More preferable |
|---|---|---|---|
| MAA | 0.5-10 | 0.5-8 | 1-5 |
| MC1-4 | 19-45 | 21-39 | 22-39 |
| AC6-10 | 80-40 | 78-50 | 76-50 |
| MKC2-4 | 0.5-5 | 0.5-3 | 1-3 |

The reactive emulsifier is an emulsifier having a radically-polymerizable double bond in a molecule thereof. The number of such radically-polymerizable double bonds is usually 1.

The reactive emulsifier is preferably an anion-type reactive emulsifier having an anionic group in a molecule thereof. Such an anion-type reactive emulsifier may also be sometimes referred to as "reactive anionic surfactant". Examples of the anionic group include a sulfonic acid group, a sulfonate group, a sulfuric acid ester group, a phosphoric acid group, a phosphoric acid ester group, a nitric acid ester group, a carboxy group, and salts thereof. In particular, a sulfonic acid group, a sulfonate group, a sulfuric acid ester group, and salts thereof are preferable, and a salt of a sulfuric acid ester group is more preferable. Examples of such a salt include ammonium salts and alkali metal salts (such as a sodium salt and a potassium salt).

The reactive emulsifier is preferably, for example, an ethylenically unsaturated monomer having a group selected from a sulfonic acid group, a sulfonate group, a sulfuric acid ester group, a phosphoric acid group, a phosphoric acid ester group, and salts thereof.

Specific examples of the reactive emulsifier include polyoxyalkylene alkenyl ether sulfate ammonium, ether sulfate type ammonium, phosphoric acid ester, bis(polyoxyethylene polycyclic phenyl ether)methacrylate sulfuric acid ester, sodium 2-sulfoethyl methacrylate, alkoxy polyethylene glycol maleic acid ester, and salts thereof. Specific examples of the reactive emulsifier include sodium alkylallylsulfosuccinate (Eleminol JS-20 manufactured by Sanyo Chemical Industries, Ltd.), dipotassium alkenylsuccinate (Latemul ASK manufactured by Kao Corporation), a polyoxyethylene alkyl propenyl phenyl ether sulfuric acid ester salt (Aqualon HS-10 manufactured by DKS Co., Ltd.), an α-[1-[(allyloxy)methyl]-2-(nonylphenoxy)ethyl]-ω-polyoxyethylene sulfuric acid ester salt (Adeka Reasoap SE series such as Adeka Reasoap SE-10N manufactured by ADEKA Corporation), a polyoxyethylene-1-(allyloxymethyl)alkyl ether sulfuric acid ester ammonium salt (Aqualon KH series such as Aqualon KH-1025 manufactured by DKS Co., Ltd.), a styrenesulfonic acid salt (Spinomar NaSS manufactured by Tosoh Finechem Corporation), an α-[2-[(allyloxy)-1-(alkyloxymethyl)]ethyl]-ω-polyoxyethylene sulfuric acid ester salt (Adeka Reasoap SR series such as Adeka Reasoap SR-1025 manufactured by ADEKA Corporation), a sulfuric acid ester salt of polyoxyethylene polyoxybutylene (3-methyl-3-butenyl) ether (Latemul PD-104 manufactured by Kao Corporation), and an ammonium salt of [a sulfuric acid esterified product of (an oxirane polyaddition product of {a reaction product of C10-C14 branched alkanol and 1-(allyloxy)-2,3-epoxypropane}, mainly containing {α-[2-(allyloxy)-1-({C10-C14 alkyloxy}methyl)ethyl]-ω-hydroxypoly (n=1 to 100) (oxyethylene)})]. In particular, an ammonium salt of [a sulfuric acid esterified product of (an oxirane polyaddition product of {a reaction product of C10-C14 branched alkanol and 1-(allyloxy)-2,3-epoxypropane}, mainly containing {α-[2-(allyloxy)-1-({C10-C14 alkyloxy}methyl)ethyl]-ω-hydroxypoly (n=1 to 100) (oxyethylene)})] is preferable.

The reactive emulsifier is used in combination with the four types of monomers, in synthesis of the polymer resin. Thus, an emulsion of the polymer resin can be obtained. In a case where the ink according to the present embodiment is prepared, such an emulsion of the polymer resin is preferably used.

The amount of the reactive emulsifier used in synthesis of the polymer resin is not particularly limited. The target of the amount used is usually 0.1 to 10% by mass, preferably 0.3 to 5% by mass, more preferably 0.5 to 3% by mass, further preferably 1 to 3% by mass, based on the total mass of the four types of monomers. The reactive emulsifier is used in the above range, and thus the polymer resin can be stably synthesized, the average particle size of the polymer resin can be controlled in a suitable range, and it is likely that the viscosity of the emulsion of the polymer resin can be adjusted in a suitable range.

The polymer resin usually has an average particle size of 10 to 500 nm, preferably 20 to 200 nm, more preferably 40 to 120 nm, further preferably 70 to 90 nm. The average particle size is in the range, resulting in a tendency to suppress clogging of an ink-jet head and re-aggregation of the polymer resin.

The polymer resin usually has a glass transition point (Tg) of −30 to 25° C., preferably −25 to 20° C., more preferably −20 to 20° C., further preferably −15 to 20° C. The polymer resin usually has an acid value of 0.5 to 80 mgKOH/g, preferably 5 to 75 mgKOH/g, more preferably 8 to 70 mgKOH/g, further preferably 10 to 65 mgKOH/g.

The polymer resin usually has an insolubility in tetrahydrofuran, of 80 to 100%, preferably 90 to 100%. The insolubility is set as above, resulting in a tendency to not only allow the average molecular weight of the polymer resin to be controlled, but also allow the polymer resin not to contain any unreacted monomer and the like as impurities.

The lower limit value of the content rate (value in terms of solid) of the polymer resin in the total mass of the ink according to the present embodiment is usually 0.1% by mass, preferably 0.2% by mass, more preferably 0.3% by mass, and the upper limit value thereof is usually 10% by mass, preferably 7% by mass, more preferably 6% by mass, further preferably 5% by mass.

[Water]

The water is preferably one in which the content of impurities (metal ion and the like) is low, such as ion-exchange water or distilled water.

The content rate of the water in the total mass of the ink according to the present embodiment is usually 30 to 80% by mass, preferably 35 to 75% by mass, more preferably 40 to 70% by mass.

[Water-Soluble Organic Solvent]

The ink according to the present embodiment preferably further contains a water-soluble organic solvent. Examples of the water-soluble organic solvent include C1-C6 alkanols such as methanol, ethanol, propanol, isopropanol, butanol, isobutanol, sec-butanol, and tert-butanol; carboxylic acid amides such as N,N-dimethylformamide and N,N-dimethylacetamide; lactams such as 2-pyrrolidone, N-methyl-2-pyrrolidone, and N-methylpyrrolidin-2-one; cyclic ureas such as 1,3-dimethylimidazolidin-2-one and 1,3-dimethylhexahydropyrimid-2-one; ketones or keto alcohols, such as acetone, 2-methyl-2-hydroxypentan-4-one, and ethylene carbonate; cyclic ethers such as tetrahydrofuran and dioxane; mono-, oligo-, or poly-alkylene glycols and thioglycols each having a C2-C6 alkylene unit, such as ethylene glycol, diethylene glycol, 1,2-propylene glycol, 1,3-propylene glycol, 1,2-butylene glycol, 1,4-butylene glycol, diethylene glycol, triethylene glycol, tetraethylene glycol, dipropylene glycol, polyethylene glycol (preferably having a molecular weight of 400, 800, or 1540 or more), polypropylene glycol, thiodiglycol, and dithiodiglycol; C3-C9 polyols (triols) such as glycerin, diglycerin, hexane-1,2,6-triol, and trimethylolpropane; glycol ethers (glycol ethers preferably selected from the group consisting of C3-C10 mono-, di- or tri-ethylene glycol ethers and C4-C13 mono-, di- or tri-propylene glycol ethers) such as ethylene glycol monomethyl ether, ethylene glycol monoethyl ether, ethylene glycol monoallyl ether, ethylene glycol monoisopropyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, propylene glycol monopropyl ether, propylene glycol monobutyl ether, and dipropylene glycol monomethyl ether; C5-C9 alkanediols such as 1,2-pentanediol, 1,5-pentanediol, 1,2-hexanediol, 1,6-hexanediol, 2-methyl-2,4-pentanediol, 2-ethyl-1,3-hexanediol, and 2,4-diethyl-1,5-pentanediol; γ-butyrolactone; and dimethylsulfoxide. In particular, at least one water-soluble organic solvent selected from the group consisting of glycol ethers and C5-C9 alkanediols is preferably used.

The content rate of the water-soluble organic solvent in the total mass of the ink according to the present embodiment is usually 0 to 60% by mass, preferably 1 to 60% by mass, more preferably 2 to 50% by mass, further preferably 3 to 45% by mass, particularly preferably 5 to 40% by mass.

[Other Component]

The ink according to the present embodiment may further contain an ink preparation agent, in addition to the above components. Examples of the ink preparation agent include a surfactant (provided that one corresponding to the reactive emulsifier is excluded), a preservative fungicide, a pH adjuster, and a defoamer.

The total content rate of the ink preparation agent in the total mass of the ink according to the present embodiment is usually 0 to 30% by mass, preferably 0.1 to 20% by mass, more preferably 0.5 to 10% by mass.

Examples of the surfactant include anionic, cationic, nonionic, amphoteric, silicone-based, and fluorine-based respective surfactants. In particular, a surfactant selected from silicone-based and fluorine-based surfactants is preferable, and a silicone-based surfactant is more preferable from the viewpoint of safety to a living body and an environment.

Examples of the anionic surfactant include an alkylsulfocarboxylic acid salt, an α-olefinsulfonic acid salt, a polyoxyethylene alkyl ether acetic acid salt, a polyoxyethylene alkyl ether sulfuric acid salt, N-acylamino acid or a salt thereof, an N-acylmethyltaurine salt, an alkylsulfate polyoxyalkyl ether sulfuric acid salt, an alkylsulfate polyoxyethylene alkyl ether phosphoric acid salt, rosin acid soap, a castor oil sulfuric acid ester salt, a lauryl alcohol sulfuric acid ester salt, an alkylphenol-type phosphoric acid ester, an alkyl-type phosphoric acid ester, an alkylarylsulfonic acid salt, a diethylsulfosuccinic acid salt, a diethylhexylsulfosuccinic acid salt, and a dioctylsulfosuccinic acid salt.

Examples of the cationic surfactant include a 2-vinylpyridine derivative and a poly 4-vinylpyridine derivative.

Examples of the nonionic surfactant include ethers such as polyoxyethylene nonyl phenyl ether, polyoxyethylene octyl phenyl ether, polyoxyethylene dodecyl phenyl ether, polyoxyethylene oleyl ether, polyoxyethylene lauryl ether, polyoxyethylene alkyl ether, and polyoxyethylene distyrenated phenyl ether (for example, Emulgen A-60, A-90, and A-500 manufactured by Kao Corporation); esters such as polyoxyethylene oleic acid ester, polyoxyethylene distearic acid ester, sorbitan laurate, sorbitan monostearate, sorbitan monooleate, sorbitan sesquioleate, polyoxyethylene monooleate, and polyoxyethylene stearate; acetylene glycols (alcohols) such as 2,4,7,9-tetramethyl-5-decyne-4,7-diol, 3,6-dimethyl-4-octyne-3,6-diol, and 3,5-dimethyl-1-hexyn-3-ol; and polyglycol ethers. Examples of a commercialized product include Surfynol 104, 104PG50, 82, 420, 440, 465, and 485, and Olfine STG, which are manufactured by Nissin Chemical Co., Ltd.; and Emulgen A-60, A-90, and A-500 manufactured by Kao Corporation.

Examples of the amphoteric surfactant include lauryldimethylaminoacetic acid betain, 2 alkyl-N-carboxymethyl-N-hydroxyethyl imidazolinium betain, coconut oil fatty acid amide propyldimethylaminoacetic acid betain, polyoctyl polyaminoethyl glycin, and an imidazoline derivative.

Examples of the silicone-based surfactant include polyether-modified siloxane and polyether-modified polydimethylsiloxane. Examples include Dinol 960 and 980 manufactured by Air Products and Chemicals, Inc.; Silface SAG001, SAG002, SAG003, SAG005, SAG503A, SAG008, SAG009, and SAG010 manufactured by Nissin Chemical Co., Ltd.; BYK-345, 347, 348, 349, 3455, LP-X23288, LP-X23289, and LP-X23347 manufactured by BYK Additives & Instruments; and TEGO Twin 4000, and TEGO Wet KL 245, 250, 260, 265, 270, and 280 manufactured by Evonik Tego Chemie GmbH.

Examples of the fluorine-based surfactant include a perfluoroalkylsulfonic acid compound, a perfluoroalkyl carboxylic acid-based compound, a perfluoroalkylphosphoric acid ester compound, a perfluoroalkylethylene oxide adduct, and a polyoxyalkylene ether polymer compound having a perfluoroalkyl ether group in a side chain.

Examples of the preservative fungicide include organic sulfur-based, organic nitrogen sulfur-based, organic halogen-based, haloaryl sulfone-based, iodopropargyl-based, haloalkylthio-based, nitrile-based, pyridine-based, 8-oxyquinoline-based, benzothiazole-based, isothiazoline-based, dithiol-based, pyridine oxide-based, nitropropane-based, organic tin-based, phenol-based, quarternary ammonium salt-based, triazine-based, thiazine-based, anilide-based, adamantane-based, dithiocarbamate-based, brominated indanone-based, benzyl bromoacetate-based, and inorganic salt-based compounds; and sodium dehydroacetate, sodium benzoate, sodium pyridinethione-1-oxide, p-hydroxybenzoic acid ethyl ester, and 1,2-benzisothiazolin-3-one and a salt thereof. Examples of a commercialized product of the preservative fungicide include Proxel GXL (S) and XL-2 (S) manufactured by Arch Chemicals, Inc.

The pH adjuster here used can be any substance as long as it is a compound which does not have any adverse effect on the ink prepared and which can adjust the pH to 5 to 11. Specific examples thereof include alkanolamines such as diethanolamine, triethanolamine, and N-methyldiethanolamine; alkali metal hydroxides such as lithium hydroxide, sodium hydroxide, and potassium hydroxide; ammonium hydroxide (ammonia water); carbonic acid salts of alkali metals, such as lithium carbonate, sodium carbonate, sodium hydrogen carbonate, and potassium carbonate; alkali metal salts of organic acids, such as sodium silicate and potassium acetate; and inorganic bases such as disodium phosphate.

Examples of the defoamer include silicone-based, silica/mineral oil-based, olefin-based, and acetylene-based compounds. Examples of a commercially available defoamer include Surfynol DF37, DF58, DF110D, DF220, and MD-20; and Olfine SK-14, which are all manufactured by Shin-Etsu Chemical Co., Ltd.

In a case where the defoamer is used, the content rate of the defoamer is usually 0.01 to 5% by mass, preferably 0.03 to 3% by mass, more preferably 0.05 to 1% by mass. The content of the defoamer is 0.01% by mass or more, resulting in a tendency to allow the effect as the defoamer to be obtained, and the content is 5% by mass or less, resulting in a tendency to allow dispersion stability to be improved.

[Physical Properties and the Like of Ink]

In a case where the ink according to the present embodiment is used as an ink for ink-jet recording, one is preferably used in which the content rate of inorganic impurities, for example, chloride of metal cation (for example, sodium chloride) and a sulfuric acid salt (for example, sodium sulfate), in the ink is low. The target of the content rate of such inorganic impurities is about 1% by mass or less based on the total mass of the colorant. The lower limit may be equal to or less than the detection limit of an analysis instrument, namely, 0% by mass.

Such inorganic impurities are often incorporated in the colorant. Thus, the colorant can be, if necessary, purified by removing such inorganic impurities from the colorant. Examples of the purification method include a purification method involving suspending the solid of the colorant in a mixed solvent of C1-C4 alcohol such as methanol and water; and a method involving preparing the ink and then exchanging and adsorbing such inorganic impurities with and to an ion-exchange resin.

The ink according to the present embodiment usually has a pH at 25° C., of 7 to 11, preferably 8 to 10. The ink according to the present embodiment usually has a surface tension at 25° C., of 10 to 50 mN/m, preferably 20 to 40 mN/m. The ink according to the present embodiment usually has a viscosity at 25° C., of 2 to 30 mPa·s, preferably 3 mPa·s to 20 mPa·s. The pH, the surface tension, and the viscosity of the ink according to the present embodiment can be appropriately adjusted by, for example, the pH adjuster, the surfactant, and the water-soluble organic solvent.

The ink according to the present embodiment can be used in various kinds of recording. For example, the ink according to the present embodiment is suitable for writing things, various kinds of printing, recording of information, textile printing, and the like, and is particularly preferably used in ink-jet recording.

[Ink-Jet Recording Method, Ink-Jet Printer, and Recording Medium]

An ink-jet recording method according to the present embodiment performs recording by ejecting a droplet of the above ink from an ink-jet printer depending on a recording signal, to allow the droplet to adhere to a recording medium. When ink-jet recording is performed, the recording can be performed as described above by installing a vessel filled with the ink at a predetermined location in an ink-jet printer.

The ink may be used singly or in combination with other ink, in the ink-jet recording method of the present invention.

The ink can also be used in combination with an ink containing each colorant of yellow, blue, red, green, violet, and orange for the purpose of, for example, providing a full-color recorded image.

An industrial ink-jet printer preferably performs also single-pass printing in a configuration of a line head type ink-jet printer, for the purpose of an increase in printing speed. The ink can allow a recorded image having favorable chromogenic properties and also excellent scratch resistance to be obtained even in such printing conditions.

An ink-jet system here used can be a known system. Specific examples of the ink-jet system include a charge control system, a drop on demand (pressure pulse) system, an acoustic ink-jet system, and a thermal ink-jet system. The system also encompasses a system in which a low volume of the ink, which is low in content of the colorant therein, is injected in a large number to result in an improvement in image quality; a system in which a plurality of such inks, which are substantially the same in hue and are different in colorant concentration therein, are used to result in an improvement in image quality; and a system in which the ink, which is colorless and transparent, is used to result in an enhancement in fixability of the colorant.

The recording medium means a substance to which the ink can adhere. Examples of the recording medium include paper, a film, a fiber or cloth (for example, cellulose, nylon, and wool), leather, and a substrate for a color filter.

The recording medium can be roughly classified to one having an ink-receiving layer and one having no ink-receiving layer.

The recording medium having an ink-receiving layer is usually called, for example, ink-jet-dedicated paper, an ink-jet-dedicated film, or glossy paper. Examples of a representative commercialized product thereof include Professional Photopaper, Super Photopaper, Glossy Gold, and Mat Photopaper manufactured by Canon Inc.; Photo Paper Crispia (Super Glossy), Photo Paper (Glossy), and Photo Matte Paper manufactured by Seiko Epson Corporation; Advanced Photo Paper (Glossy) manufactured by Hewlett Packard Japan, Ltd.; and Kassai Shashin-Shiage Pro manufactured by FUJIFILM Corporation.

Examples of the recording medium having no ink-receiving layer include various paper sheets for use in, for example, gravure printing or offset printing, such as coated paper and art paper; and cast-coated paper for use in label printing. The ink can be suitably used for the recording medium having no ink-receiving layer.

In a case where the recording medium having no ink-receiving layer is used, the recording medium is preferably subjected to a surface modification treatment for the purpose of an enhancement in, for example, fixability of the colorant. Examples of the surface modification treatment include a corona discharge treatment, a plasma treatment, and a flame treatment.

In all the items described above, a combination of those preferred is more preferable, and a combination of those more preferred is further preferable. The same applies to, for example, a combination of one preferred and one more preferred, and a combination of one more preferred and one further preferred.

EXAMPLES

Hereinafter, the present invention is described in more detail with reference to Examples, but the present invention is not limited by such Examples.

In Examples, "part(s)" and "%" respectively mean "part(s) by mass" and "% by mass", unless particularly noted. Various operations such as syntheses and preparations in Examples were all performed under stirring, unless particularly noted. The content rate of a solid in a liquid, when measured, was determined according to a dry mass method with MS-70 manufactured by A & D Co., Ltd.

The "water" used in Examples was ion-exchange water. The reactive emulsifier used in Examples was an ammonium salt of [a sulfuric acid esterified product of (an oxirane polyaddition product of {a reaction product of C10-C14 branched alkanol and 1-(allyloxy)-2,3-epoxypropane}, mainly containing {α-[2-(allyloxy)-1-({C10-C14 alkyloxy}methyl)ethyl]-ω-hydroxypoly (n=1 to 100) (oxyethylene)})].

Preparation Example 1: Preparation of Polymer Resin 1

A liquid was obtained by adding water (100 parts), ammonium persulfate (0.3 parts), and a reactive emulsifier (1 part) to a reaction vessel made of glass (volume 3 L). After the air in the reaction vessel was replaced with nitrogen, the temperature of the liquid was raised to 70° C. To the liquid was dropped a liquid including water (120 parts), a reactive emulsifier (0.9 parts), methacrylic acid (2 parts), methyl methacrylate (37 parts), 2-ethylhexyl acrylate (59 parts), and allyl methacrylate (2 parts), over 3 hours. The temperature of the liquid was kept at 70° C. during dropping of the liquid with nitrogen being introduced. After completion of dropping of the liquid, the liquid was further subjected to a reaction at 70° C. for 2 hours, and then cooled to 40° C. To the liquid obtained was added triethanolamine (3.1 parts), to thereby obtain an emulsion of polymer resin 1, as a white suspension having a solid content of 25%. The emulsion of polymer resin 1, here obtained, is designated as "PEM 1". Polymer resin 1 here obtained had an acid value of 13 mgKOH/g and a glass transition point of −10° C.

Preparation Example 2: Preparation of Polymer Resin 2

An emulsion of polymer resin 2 was obtained as a white suspension having a solid content of 25% in the same manner as in Preparation Example 1 except for the changes to 5 parts of methacrylic acid, 33.5 parts of methyl methacrylate, 60 parts of 2-ethylhexyl acrylate, and 1.5 parts of allyl methacrylate.

The emulsion of polymer resin 2, here obtained, is designated as "PEM 2". Polymer resin 2 here obtained had an acid value of 33 mgKOH/g and a glass transition point of −5° C.

Preparation Example 3: Preparation of Polymer Resin 3

An emulsion of polymer resin 3 was obtained as a white suspension having a solid content of 25% in the same manner as in Preparation Example 1 except for the changes to 3 parts of methacrylic acid, 36 parts of methyl methacrylate, 59 parts of 2-ethylhexyl acrylate, and 2 parts of allyl methacrylate. The emulsion of polymer resin 3, here obtained, is designated as "PEM 3". Polymer resin 3 here obtained had an acid value of 20 mgKOH/g and a glass transition point of −5° C.

Preparation Example 4: Preparation of Polymer Resin 4

An emulsion of polymer resin 4 was obtained as a white suspension having a solid content of 24.9% in the same manner as in Preparation Example 1 except that polyoxyethylene alkyl ether being a nonionic emulsifier was used instead of the reactive emulsifier. The emulsion of polymer resin 4, here obtained, is designated as "PEM 4". Polymer resin 4 here obtained had an acid value of 13 mgKOH/g and a glass transition point of −10° C.

Preparation Example 5: Preparation of Polymer Resin 5

A liquid was obtained by adding water (60 parts), polyoxyethylene alkyl ether (0.3 parts), and ammonium persulfate (0.3 parts) to a reaction vessel made of glass (volume 3 L). After the air in the reaction vessel was replaced with nitrogen, the temperature of the liquid was raised to 70° C. To the liquid was dropped a liquid including water (70 parts), polyoxyethylene alkyl ether (10 parts), methacrylic acid (2 parts), methyl methacrylate (50 parts), 2-ethylhexyl acrylate (47 parts), and allyl methacrylate (1 part), over 3 hours. The temperature of the liquid was kept at 70° C.

during dropping of the liquid with nitrogen being introduced. After completion of dropping of the liquid, the liquid was further subjected to a reaction at 70° C. for 2 hours, and then cooled to 40° C., to thereby obtain an emulsion of polymer resin 5, as a white suspension having a solid content of 3.5%. The emulsion of polymer resin 5, here obtained, is designated as "PEM 5". Polymer resin 5 here obtained had an acid value of 13 mgKOH/g and a glass transition point of 10° C.

Preparation Example 6: Preparation of Colorant Dispersion Liquid

A block copolymer (block copolymer A) was obtained according to Synthesis Example 3 in PCT International Publication No. WO2013/115071. The block copolymer (6 parts) obtained was dissolved in 2-butanone (20 parts), to provide a uniform solution. To the solution was added a liquid in which sodium hydroxide (0.45 parts) was dissolved in water (52.3 parts), and the resultant was stirred for 1 hour to thereby obtain a liquid. To the liquid was added carbon black (20 parts, Nerox 605 manufactured by Orion Engineered Carbons), and a dispersing treatment was performed in a sand grinder in a condition of 1500 rpm for 15 hours, to thereby obtain a liquid. After water (100 parts) was dropped to the liquid obtained, the liquid was filtered to thereby obtain a filtrate. 2-Butanone and some water were distilled off from the filtrate obtained, under reduced pressure, to thereby obtain a colorant dispersion liquid in which the content rate of the colorant was 12.3%. The content rate of the colorant was determined as the value in terms of content rate of the colorant based on the total solid content in the liquid, according to a dry mass method. The measurement instrument here used was MS-70 manufactured by A & D Co., Ltd.

Examples 1 to 3: Preparation of Each Ink

After components described in Table 2 below were mixed to obtain each liquid where the total amount was 100 parts, the liquid obtained was filtered by a membrane filter having a pore size of 3 μm, to thereby obtain each ink of Examples 1 to 3.

Preparation Example 7: Preparation of Cleaning Liquid

A cleaning liquid was obtained in the same manner as in Examples 1 to 3 except that each component described in Table 2 below was used.

Comparative Examples 1 to 2: Preparation of Each Ink For Comparison

Each ink of Comparative Examples 1 to 2 was obtained in the same manner as in Examples 1 to 3 above except that each component described in Table 3 below was used.

Abbreviations and the like in Table 2 and Table 3 below have the following meanings. The numerical values in Table 2 and Table 3 are each represented as "parts". The amount of the solid in each emulsion of polymer resins 1 to 5 is represented by "parts" in the columns of PEM 1 to PEM 5 in Table 2 and Table 3. Although polymer resins 4 and 5 did not react with the emulsifier, it was likely that the emulsifier adheres to them due to hydrophobic interactions. Thus, the amount of the solid in the emulsion of polymer resin 4 or 5 was described as the total amount of polymer resin 4 or 5 and the emulsifier used.

PG: propylene glycol
2Py: 2-pyrrolidone
12HD: 1,2-hexanediol
TEA: triethanolamine
TEX: texanol
BYK-349: silicone-based surfactant, BYK-349
GXL (S): Proxel GXL (S)
PEM 1 to PEM 5: respective emulsions of polymer resins 1 to 5 obtained in Preparation Examples 1 to 5

TABLE 2

| Component | Example 1 | Example 2 | Example 3 | Cleaning liquid |
|---|---|---|---|---|
| Dispersion liquid | 40.7 | 40.7 | 40.7 | — |
| PG | 20 | 20 | 20 | 20 |
| 2Py | 5 | 5 | 5 | 5 |
| 12HD | 7 | 7 | 7 | 7 |
| TEX | 0.5 | 0.5 | 0.5 | 0.5 |
| TEA | 0.7 | 0.7 | 0.7 | 0.7 |
| BYK-349 | 0.9 | 0.9 | 0.9 | 0.9 |
| GXL (S) | 0.1 | 0.1 | 0.1 | 0.1 |
| PEM1 | 3.06 | — | — | — |
| PEM2 | — | 3.06 | — | — |
| PEM3 | — | — | 3.06 | — |
| Water | Balance | | | Balance |
| Total | 100 | | | 100 |

TABLE 3

| Component | Comparative Example 1 | Comparative Example 2 |
|---|---|---|
| Dispersion liquid | 40.7 | 40.7 |
| PG | 20 | 20 |
| 2Py | 5 | 5 |
| 12HD | 7 | 7 |
| TEX | 0.5 | 0.5 |
| TEA | 0.7 | 0.7 |
| BYK-349 | 0.9 | 0.9 |
| GXL (S) | 0.1 | 0.1 |
| PEM4 | 3.06 | — |
| PEM5 | — | 3.31 |
| Water | Balance | |
| Total | 100 | |

[Ink-Jet Recording]

Each ink obtained in the Examples and the Comparative Examples was subjected to ink-jet recording on Finesse Gloss 90 (coated paper) manufactured by UPM Japan, in conditions of a droplet size of 12 pl and a speed of 25 m/min by use of a printer on which ink-jet head KJ4B-YH (600 dpi×600 dpi) manufactured by Kyocera Corporation was mounted. The ink-jet recording was performed so that a solid image at a duty of 100% was obtained, and a recorded image subjected to the recording by such each ink of Examples or Comparative Examples was obtained. A colorimeter, under the trade name of eXact manufactured by X-Rite, Inc., was used in colorimetry of each test piece obtained as described above. Colorimetric conditions were as follows: the density criteria were according to ISO status T, the view angle was 2°, and the light source was D50.

[Test of Chromogenic Properties]

The Dk value (OD value) was obtained by subjecting such each test piece obtained as described above, to colorimetry. The results are shown in Table 4 below. A larger Dk value obtained means superior chromogenic properties.

[Scratch Resistance Test]

Such each test piece was evaluated in terms of scratching ability by use of No. 428 Gakushin type friction tester (friction tester II type) manufactured by Yasuda Seiki Seisakusho, Ltd. In other words, a portion subjected to the ink-jet recording was scratched forty times in the state where a load of 500 g was applied to such each test piece, and the degree of degradation in each image was evaluated according to the following three level criteria. The results are shown in Table 4 below.

—Evaluation Criteria—
A: almost no scratches could be observed in the recorded image.
B: few scratches could be observed in the recorded image.
C: scratches in the recorded image were very large.

[Washability Test]

20 μL of each ink of Examples and Comparative Examples was dropped on a glass petri dish, and left to still stand and dried in a constant-temperature bath at 60° C. for 1 hour, to thereby obtain a solid material in which such each ink was solidified. 10 mL of the cleaning liquid obtained in Preparation Example 7 was dropped on the solid material obtained, and whether or not the solid material could be dissolved and removed was visually evaluated. The evaluation criteria were at four levels below. The results are shown in Table 4 below.

—Evaluation Criteria—
A: no remaining of the solid material was observed, and a uniform liquid was observed.
B: slight remaining of the solid material was observed, but an almost uniform liquid was observed.
C: clear remaining of the solid material was observed, and no uniform liquid was observed.
D: the shape of the solid material was not changed at all or almost not changed.

TABLE 4

| Evaluation results | Example | | | Comparative Example | |
|---|---|---|---|---|---|
| | 1 | 2 | 3 | 1 | 2 |
| Dk value | 2.04 | 2.04 | 2.05 | 1.96 | 1.84 |
| Scratch resistance | A | A | A | A | A |
| Washability | A | A | A | C | D |

As clear from the results in Table 4, each ink of Examples had excellent chromogenic properties and scratch resistance. It was also confirmed that, even when such each ink of Examples was dried to generate a solid material, the solid material could be sufficiently dissolved and removed. On the contrary, each ink of Comparative Examples had insufficient chromogenic properties, although they had excellent scratch resistance. When such each ink of Comparative Examples was dried to generate a solid material, the solid material could not be sufficiently dissolved and removed.

The invention claimed is:

1. An ink comprising: a pigment; a dispersant; a polymer resin; and water; wherein the polymer resin consists of methacrylic acid in an amount of 0.5 to 10 parts by mass, one C1-C4 alkyl methacrylate in an amount of 19 to 45 parts by mass, one C6-C10 alkyl acrylate in an amount of 40 to 80 parts by mass, one unsaturated C2-C4 alkyl methacrylate in an amount of 0.5 to 5 parts by mass, and a reactive emulsifier having a radically-polymerizable double bond in a molecule thereof.

2. The ink according to claim 1, wherein the reactive emulsifier is an anion-type reactive emulsifier having an anionic group in a molecule thereof.

3. The ink according to claim 2, wherein the anionic group is a salt of a sulfuric acid ester group.

4. The ink according to claim 1, further comprising a water-soluble organic solvent.

5. An ink-jet recording method comprising performing recording by ejecting a droplet of the ink according to claim 1 from an ink-jet printer depending on a recording signal, to allow the droplet to adhere to a recording medium.

6. The ink-jet recording method according to claim 5, wherein the recording medium is a recording medium having an ink-receiving layer.

7. The ink-jet recording method according to claim 5, wherein the recording medium is a recording medium having no ink-receiving layer.

8. The ink-jet recording method according to claim 5, wherein the ink-jet printer is a line head type ink-jet printer.

9. A recording medium having the ink according to claim 1 adhered thereto.

10. The recording medium according to claim 9, wherein the recording medium is a recording medium selected from the group consisting of a recording medium having an ink-receiving layer and a recording medium having no ink-receiving layer.

11. An ink-jet printer comprising a vessel filled with the ink according to claim 1.

12. The ink-jet printer according to claim 11, wherein the ink-jet printer is a line head type ink-jet printer.

* * * * *